(12) United States Patent
Kuwahara et al.

(10) Patent No.: US 11,225,147 B2
(45) Date of Patent: Jan. 18, 2022

(54) DRIVE UNIT FOR FOUR-WHEEL DRIVE VEHICLE

(71) Applicant: TOYOTA JIDOSHA KABUSHIKI KAISHA, Toyota (JP)

(72) Inventors: Seiji Kuwahara, Sunto-gun (JP); Norifumi Takada, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 16/126,660

(22) Filed: Sep. 10, 2018

(65) Prior Publication Data

US 2019/0077268 A1    Mar. 14, 2019

(30) Foreign Application Priority Data

Sep. 8, 2017    (JP) .............................. JP2017-173144

(51) Int. Cl.
| | |
|---|---|
| *B60W 10/08* | (2006.01) |
| *B60K 6/485* | (2007.10) |
| *B60L 50/16* | (2019.01) |
| *B60K 6/52* | (2007.10) |
| *B60K 6/387* | (2007.10) |
| *B60K 6/40* | (2007.10) |
| *B60K 6/442* | (2007.10) |

(Continued)

(52) U.S. Cl.
CPC .............. *B60L 5/10* (2013.01); *B60K 6/387* (2013.01); *B60K 6/40* (2013.01); *B60K 6/442* (2013.01); *B60K 6/485* (2013.01); *B60K 6/52* (2013.01); *B60L 15/2009* (2013.01); *B60L 50/16* (2019.02); *B60L 58/12* (2019.02); *B60W 10/08* (2013.01); *B60L 2240/421* (2013.01); *B60L 2240/423* (2013.01); *B60L 2240/425* (2013.01); *B60L 2260/28* (2013.01)

(58) Field of Classification Search
CPC ............ B60K 6/52; B60K 6/442; B60L 50/16
USPC ......................................................... 180/243
See application file for complete search history.

(56) References Cited

U.S. PATENT DOCUMENTS

| | | | |
|---|---|---|---|
| 7,402,919 B2* | 7/2008 | Ishikawa ................. | B60K 6/26 |
| | | | 307/10.1 |
| 2003/0136597 A1* | 7/2003 | Raftari ..................... | B60K 6/52 |
| | | | 180/242 |

(Continued)

FOREIGN PATENT DOCUMENTS

| | | |
|---|---|---|
| JP | H04-116622 U | 10/1992 |
| JP | 2006-050767 A | 2/2006 |

(Continued)

*Primary Examiner* — Tony H Winner
(74) *Attorney, Agent, or Firm* — Oliff PLC

(57) ABSTRACT

In a drive unit for four-wheel drive vehicle that allows a motor for driving front wheels to be easily installed, a torque of an engine is transmitted to a rear wheel axle via a transmission and a rear propeller shaft, and a torque of a front drive motor is transmitted to a front wheel axle via a front propeller shaft. A front drive unit is disposed between the transmission and the rear wheel axle. A case of the front drive unit houses: a main shaft that transmits to the rear propeller shaft an output torque of the transmission; the front drive motor; and a sub-shaft that is disposed in a position shifted in a vehicle width direction with respect to the main shaft and transmits to the front propeller shaft an output torque of the front drive motor.

4 Claims, 6 Drawing Sheets

(51) Int. Cl.
*B60L 5/10* (2006.01)
*B60L 15/20* (2006.01)
*B60L 58/12* (2019.01)

(56) References Cited

U.S. PATENT DOCUMENTS

| | | | | |
|---|---|---|---|---|
| 2005/0107199 | A1* | 5/2005 | Minagawa | F16H 3/728 |
| | | | | 475/5 |
| 2006/0108166 | A1* | 5/2006 | Tanaka | B60W 20/00 |
| | | | | 180/248 |
| 2007/0034428 | A1* | 2/2007 | Janson | B60K 6/365 |
| | | | | 180/65.235 |
| 2007/0267233 | A1* | 11/2007 | Wenthen | B60K 6/387 |
| | | | | 180/243 |
| 2009/0186734 | A1 | 7/2009 | Perkins | |
| 2011/0276241 | A1* | 11/2011 | Nakao | B60W 10/14 |
| | | | | 701/69 |
| 2014/0297166 | A1* | 10/2014 | Aizawa | B60W 10/06 |
| | | | | 701/113 |
| 2015/0360572 | A1 | 12/2015 | Yamamoto et al. | |
| 2016/0312862 | A1* | 10/2016 | Foster | F16H 3/666 |
| 2018/0304738 | A1 | 10/2018 | Kuwahara | |

FOREIGN PATENT DOCUMENTS

| | | |
|---|---|---|
| JP | 2009-173272 A | 8/2009 |
| JP | 2011-195074 A | 10/2011 |
| JP | 2013-141872 A | 7/2013 |
| JP | 2014-108630 A | 6/2014 |
| JP | 2016-002772 A | 1/2016 |
| JP | 2016-093034 A | 5/2016 |

* cited by examiner

DRIVE UNIT FOR FOUR-WHEEL DRIVE VEHICLE

CROSS REFERENCE TO RELATED APPLICATIONS

The present disclosure claims the benefit of Japanese Patent Application No. 2017-173144 filed on Sep. 8, 2017 with the Japanese Patent Office, the disclosure of which is incorporated herein by reference in its entirety.

BACKGROUND

Field of the Disclosure

Embodiments of the present disclosure relate to the art of a drive unit for four-wheel drive vehicle in which a prime mover includes an engine and a motor or motor-generator, and by which the vehicle can run with the rear wheels powered by the engine and the front wheels powered by the motor.

Discussion of the Related Art

In a hybrid vehicle shown in FIG. 1 of JP-A-2016-2772, an engine, a rear drive motor that drives the rear wheels, and a transmission are arranged in order from the front side of the vehicle body, and a rear propeller shaft is connected to the transmission. In the hybrid vehicle described in JP-A-2016-2772, the engine drives the rear wheels, and a front drive motor that drives the front wheels is disposed on an intake side of the engine. The front drive motor is connected to the front wheels via another transmission. In the hybrid vehicle described in JP-A-2016-2772, if a transfer or a front propeller shaft are omitted, the front drive motor, the other transmission, and the rear drive motor can be installed without interfering with other components.

In the hybrid vehicle described in JP-A-2016-2772, the left and right front wheels are connected via the front drive motor, and a differential gear unit is provided between the left and right front wheels so as to allow the left and right front wheels to differentially rotate during turning. Lengths of the left and right axles are preferably equal, hence the differential gear unit is preferably provided in a central section in a vehicle width direction. Moreover, because a drive torque is transmitted to the left and right front wheels via the differential gear unit, the front drive motor is also provided in the central section in the vehicle width direction. Due to the engine, the front drive motor, and the differential gear unit being thus disposed in a limited space in the central section in the vehicle width direction, there is a risk that a structure or a design of the vehicle body will be restricted.

This kind of difficulty can be overcome by downsizing the front drive motor or the differential gear unit. However, since the torque driving the front wheels will be reduced, there is a risk that a driving power of the four-wheel drive vehicle will be restricted.

Furthermore, in the hybrid vehicle described in JP-A-2016-2772, since not only the engine, but also the front drive motor or differential gear unit are installed on the front side of the vehicle body, the vehicle body will be front-heavy. As a result, there is a risk that running stability or turning performance, and so on, of the vehicle body will worsen.

Aspects of embodiments of the present disclosure have been conceived noting the foregoing technical problems, and it is therefore an object of the present disclosure to provide a drive unit for four-wheel vehicle in which spatial restrictions on a front drive motor are reduced as far as possible, thereby improving installability of the front drive motor.

SUMMARY

A drive unit for a four-wheel drive vehicle according to the present embodiment includes: a pair of front wheels; a pair of rear wheels; an engine that is disposed between the front wheels; a transmission that is disposed to the rear of the engine; a rear propeller shaft that transmits a torque to the rear wheels; a front propeller shaft that is disposed in a position shifted in one direction in a width direction of a vehicle body with respect to the rear propeller shaft, and transmits a torque to the front wheels; and a front drive unit that is disposed to the rear of the transmission and more to the front than an axle of the rear wheels is. The front drive unit includes: a main shaft that transmits to the rear propeller shaft an output torque of the transmission; a first motor that is disposed in a position shifted in the one direction with respect to the main shaft; a sub-shaft that transmits to the front propeller shaft a torque of a rotor shaft of the first motor; and a case that houses the main shaft, the first motor, and the sub-shaft.

In a non-limiting embodiment, the case may have an extended section extending in the one direction from a center in the width direction of the vehicle body, and the first motor may be housed in the extended section.

In a non-limiting embodiment, the drive unit may further include an exhaust pipe that discharges toward the rear of the vehicle body an exhaust gas generated by the engine. The one direction may be a direction opposite to a direction pointing from the main shaft to the exhaust pipe in the width direction of the vehicle body.

In a non-limiting embodiment, the front drive unit may be disposed on the inside of the case coaxially with the sub-shaft. The drive unit may further include a speed reducing device that reduces a rotational speed of the front propeller shaft with respect to a rotational speed of the rotor shaft.

In a non-limiting embodiment, the front drive unit may be disposed on the inside of the case coaxially with the sub-shaft, and a gear stage of the front drive unit may include a plurality of gear stages whose speed ratios differ. The drive unit may further include a front transmission that increases and decreases a torque generated by the rotor shaft.

In a non-limiting embodiment, the front drive unit may further include a front transmission housed in the case that establishes a plurality of gear stages. The front transmission may be disposed coaxially with the sub-shaft and between the first motor and the speed reducing device or on an opposite side to the first motor with respect to the speed reducing device. The front transmission may increase and decrease a torque transmitted from the rotor shaft of the first motor or a torque transmitted from the speed reducing device.

In a non-limiting embodiment, the front drive unit may include a disconnecting mechanism that disconnects torque transmission between the sub-shaft and the first motor.

In a non-limiting embodiment, the front drive unit may further include a sub-transmission that is disposed in the case coaxially with the main shaft and that establishes a plurality of gear stages. The sub-transmission may increase and decrease a torque transmitted from the transmission.

In a non-limiting embodiment, the drive unit may further include: an operating section for selecting a gear stage between the front transmission and the sub-transmission; and an interlocking section that, by the operating section being shifted to a position establishing a gear stage as a maximum speed ratio, sets the gear stage of the front transmission to a first stage as a maximum speed ratio, and sets the sub-transmission to a first stage as a maximum speed ratio.

In a non-limiting embodiment, the drive unit may further include: a second motor having an electric power generating function, that is disposed between the engine and the transmission and adds a torque to a torque generated by the engine; a clutch that is provided in the transmission and selectively interrupts a torque transmission to the main shaft; an electricity storing device that stores electric power generated by the second motor; and an electric power supplying section that supplies the first motor with electric power stored in the electricity storing device.

In a non-limiting embodiment, the first motor may have an electric power generating function. The drive unit may include an electricity storing device that stores electric power generated by the first motor.

Due to the present embodiment, the front drive unit is disposed to the rear of the transmission and more to the front than the axle of the rear wheels is. Therefore, the front drive unit can be handled integrally, and assembly work can be simplified. Moreover, the first motor or another component is hardly restricted spatially. In addition, since the first motor is disposed more to a rear wheels side than the transmission is, and shifted in one direction in the width direction of the vehicle body, a space for housing the first motor can be made larger.

Moreover, since the case has formed therein the extended section extending in the one direction in the width direction of the vehicle body, the first motor can be easily housed in the case.

In addition, the first motor driving the front wheels can be disposed so as to effectively utilize a space on an opposite side to the exhaust pipe sandwiching the rear propeller shaft.

In addition, since the speed reducing device is disposed on an output side of the first motor, a high rotational speed type motor can be used as the first motor. Consequently, an outer diameter of the first motor can be made smaller without a torque of the first motor being lowered. Therefore, a minimum ground clearance of the vehicle body can be secured without, for example, a floor of a cabin being raised.

Moreover, by a torque of the rotor shaft being amplified by the front transmission, the vehicle can run at high speed in a gear stage having a small speed ratio during running on a surfaced road. Conversely, when running off-road, a driving power of the front wheels can be increased by establishing a gear stage having a large speed ratio by the front transmission.

Moreover, by a torque of the speed reducing device being amplified by the front transmission, the vehicle can run at high speed in a gear stage having a small speed ratio during running on a surfaced road. Conversely, when running off-road, a driving power of the front wheels can be increased by establishing a gear stage having a large speed ratio by the interlocking section.

Moreover, by disconnecting the sub-shaft and the rotor shaft by the disconnecting mechanism, the first motor can be prevented from passively rotating when running by a driving power of the engine. Therefore, power loss can be reduced.

Due to the present disclosure, by a torque of the transmission being amplified by the sub-transmission, a driving power of the rear wheels can be increased when running off-road. In this case, by establishing a gear stage having a large speed ratio by the front transmission, an off-road driving performance can be further improved.

Moreover, when a speed ratio of either one of the front transmission or the sub-transmission has been set to a maximum speed ratio according to a position by the operating section, the speed ratio of the other transmission can also be set to a maximum speed ratio by the interlocking section.

In addition, an operation mode of the vehicle can be selected from a plurality of modes. For example, it is possible to select a series hybrid mode in which the second motor is driven by the engine, electric power generated by the second motor is utilized to drive the first motor, and the vehicle is run by power of the first motor.

Due to the present disclosure, the first motor can be caused to serve as an electric power generator. For example, by driving the front wheels by the first motor during deceleration, a grounding load of the front wheels increases, and electricity can be efficiently generated.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
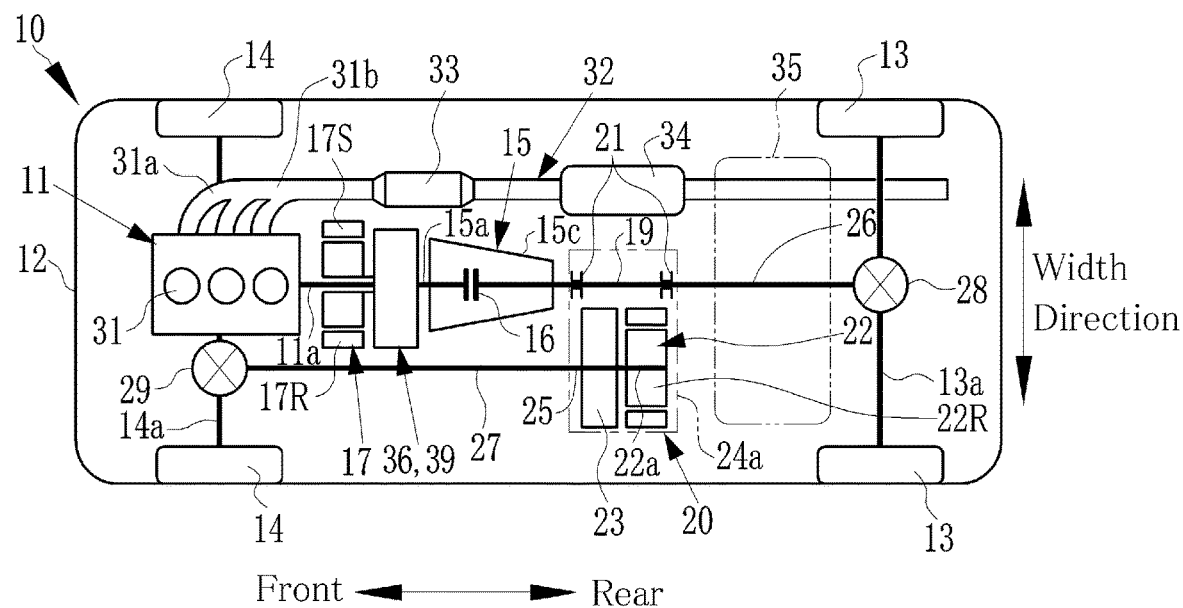
FIG. 1 is a schematic illustration showing an example of a four-wheel drive vehicle according to at least one embodiment of the present disclosure.

Embodiments of the present disclosure will now be explained with reference to the accompanying drawings. Turning now to FIG. 1, there is shown a powertrain of a four-wheel drive vehicle 10 according to at least one embodiment of the present disclosure. The vehicle 10 shown in FIG. 1 is a front-engine rear-drive layout four-wheel drive vehicle in which an engine 11 is disposed in a front side of a vehicle body 12, and a power of the engine 11 is transmitted to rear wheels 13. The engine 11 is disposed between left and right front wheels 14 in such a manner that an output shaft (or crankshaft) 11a extends in a front-rear direction of the vehicle body. In other words, the engine 11 is disposed in substantially a central section in a width direction of the vehicle body 12.

A transmission 15 as a main transmission is disposed on an output side of the engine 11, and the output shaft 11a of the engine 11 is connected to an input shaft 15a of the transmission 15. The likes of a geared transmission or a continuously variable transmission, for example, may be adopted as the transmission 15, and the transmission 15 allows a ratio of input speed to output speed to be appropriately changed. The transmission 15 includes a clutch 16 that transmits a torque by being engaged. By the clutch 16 being released, torque transmission is interrupted and a neutral stage is established.

The engine 11 and the transmission 15 are disposed coaxially to each other, and a rear drive motor 17 as a second motor is disposed between those engine 11 and main transmission 15. The rear drive motor 17 is used mainly to generate a driving power for running of the vehicle 10, but also to generate a motoring torque to start the engine 11. In a series hybrid mode, the rear drive motor 17 serves as an electric power generator. For these purposes, the rear drive motor 17 is connected to the output shaft 11a of the engine 11 or the input shaft 15a of the transmission 15, via a planetary gear unit 36. Note that the rear drive motor 17 may be connected to the output shaft 11a of the engine 11 or the input shaft 15a of the transmission 15 directly.

A rear propeller shaft 26 is connected to a rear axle 13a via a rear differential gear unit 28 as a final reduction gear, and a torque of the rear propeller shaft 26 is distributed to the left and right rear wheels 13 via the rear differential gear unit 28. A front propeller shaft 27 is connected to a front axle 14a via a front differential gear unit 29 as a final reduction gear, and a torque of the front propeller shaft 27 is distributed to the left and right front wheels 14 via the front differential gear unit 29.

The rear propeller shaft 26 is disposed in substantially a center in the vehicle width direction, and the front propeller shaft 27 is disposed in a position shifted in one direction in the vehicle width direction with respect to the rear propeller shaft 26.

A front drive unit 20 is disposed on an output side of the transmission 15. A case 24 of the front drive unit 20 houses: a main shaft 19 that transmits toward the rear propeller shaft 26 a torque generated by the transmission 15; bearings 21 that are fixed to the case 24 and support the main shaft 19 in a manner allowing the main shaft 19 to rotate; a front drive motor 22 as a first motor; a front transmission 23; and a sub-shaft 25. Therefore, the front drive unit 20 can be handled integrally. Specifically, the case 24 has an extended section 24a that extends in one direction from the center in the vehicle width direction, and the extended section 24a houses the front drive motor 22, the front transmission 23, and the sub-shaft 25. Note that the main shaft 19 may be formed integrally with the rear propeller shaft 26.

A torque generated by a rotor 22R of the front drive motor 22 is transmitted to the sub-shaft 25 via the front transmission 23. A rotor shaft 22a is connected to the rotor 22R. The sub-shaft 25 transmits to the front propeller shaft 27 the torque generated by the rotor 22R or a torque generated by the front transmission 23. The sub-shaft 25 may be formed integrally with the front propeller shaft 27 and the rotor shaft 22a. That is, the sub-shaft 25 also is positioned parallel to the main shaft 19 in a position shifted in one direction in the vehicle width direction with respect to the main shaft 19.

The front transmission 23 may be configured by a gear unit, for example, and an output torque of the front drive motor 22 is transmitted amplified to the sub-shaft 25. The vehicle 10 is a part-time four-wheel drive vehicle, in which a torque can be transmitted to the front wheels 14 in a four-wheel drive mode by driving the front drive motor 22.

The engine 11 includes a plurality of cylinders 31 and an exhaust pipe 32, and generates a mechanical power by combusting an air/fuel mixture. The exhaust pipe 32 includes: an exhaust manifold 31a communicating with each of the cylinders 31; and an exhaust pipe 31b communicated with the exhaust manifold 31a, and discharges a combustion exhaust gas toward the rear of the vehicle body 12. An exhaust gas purifying catalyst 33 and a silencer 34 are provided partway along the exhaust pipe 32.

The engine 11 is a straight engine in which the cylinders 13 are arranged in line, and the exhaust pipe 32 is connected to a right side of the engine 11. The exhaust pipe 32 extends to the rear side of the vehicle body 12 passing along the right sides of the engine 11, transmission 15, and so on, that are disposed in a center in the vehicle width direction. The extended section 24a of the case 24 extends on an opposite side to the exhaust pipe 32, sandwiching the main shaft 19, in the vehicle width direction. In other words, the front propeller shaft 27, the front drive motor 22, and the sub-shaft 25 are disposed on the opposite side to the exhaust pipe 32, sandwiching the main shaft 19, in the vehicle width direction. These exhaust pipe 32, front propeller shaft 27, transmission 15, front drive unit 20, rear propeller shaft 26, and so on, are arranged underneath an unillustrated floor panel.

Note that the exhaust pipe 32 may be connected to the left side in the vehicle width direction of the engine 11. In this case, the front propeller shaft 27, the front drive motor 22, and the sub-shaft 25 should be disposed on an opposite side to the exhaust pipe 32, sandwiching the engine 11, the transmission 15, and so on, in the vehicle width direction.

The front drive motor 22 generates a driving power for running of the vehicle 10, and, in addition, performs energy regeneration during deceleration. For example, a motor having an electric power generating function like a permanent magnet synchronous motor may be adopted as the front drive motor 22. By driving the front wheels 14 by this front drive motor 22, a grounding load of the front wheels 14 increases during deceleration. For this reason, slipping of the front wheels 14 when braking is lessened, whereby regeneration efficiency improves. Note that the rotor shaft 22a of the front drive motor 22 may be connected to the sub-shaft 25 or front propeller shaft 27 directly, omitting the front transmission 23.

The case 24 of the front drive unit 20 is configured as a separate body to a housing 15c of the transmission 15. The front drive unit 20 may be disposed between the transmission 15 and the axle 13a of the rear wheels 13 or rear differential gear unit 28. The case 24 should be attached to the vehicle body 12 so as to straddle the main shaft 19 and the sub-shaft 25. The front drive motor 22 is disposed on the inside of the case 24 to be supported by the case 24. Therefore, there is less need to change a configuration of a frame in a periphery of the engine 11 or a crushable zone (crumple zone) of the vehicle body 12, and safety of the vehicle body 12 can be secured more, compared to, for example, a vehicle body in which the front drive motor 22 has been disposed in the periphery of the engine 11. Moreover, since the case 24 is attached to the vehicle body 12 so as to straddle the main shaft 19 and the sub-shaft 25, the case 24 can be firmly attached to the vehicle body 12, and the front drive motor 22 can be firmly fixed.

A fuel tank 35 is disposed between the front drive unit 20 and the rear differential gear unit 28. A shape of the fuel tank 35 may be changed to match a shape of the front drive unit 20.

Figure 2:
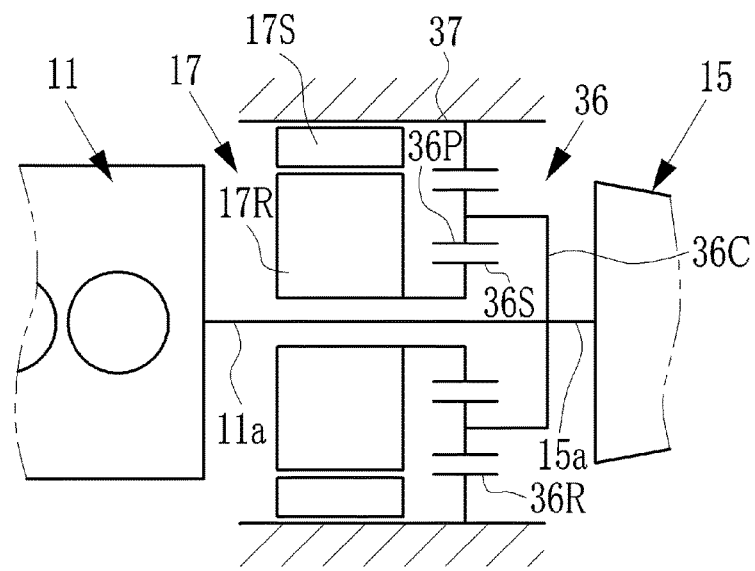
FIG. 2 is a schematic illustration showing an example of a transmission of the four-wheel drive vehicle shown in FIG. 1.

FIG. 2 shows a structure of the planetary gear unit serving as a speed reducing device 36. The speed reducing device 36 includes: a sun gear 36S; a ring gear 36R as an internal gear arranged concentrically with the sun gear 36S; a plurality of pinion gears 36P engaging with the sun gear 36S and the ring gear 36R; and a carrier 36C supporting the pinion gears 36P in a rotatable manner. Specifically, the sun gear 36S is disposed coaxially with the output shaft 11a of the engine 11 or input shaft 15a of the transmission 15, and the ring gear 36R is fixed to a certain stationary member 37 of a casing or the like. The carrier 36C is connected to the output shaft 11a of the engine 11 or input shaft 15A of the transmission 15.

The rear drive motor 17 is disposed coaxially with a rotating shaft of the sun gear 36S and includes a rotor 17R and a stator 17S. The rotor 17R is connected to the sun gear 36S, and the stator 17S is fixed is fixed to the certain stationary member 37. Disposing the speed reducing device 36 and the rear drive motor 17 coaxially with the engine 11, the transmission 15, and so on, in this way enables the powertrain to be downsized. In particular, a maximum outer diameter of the powertrain can be reduced.

Figure 3:
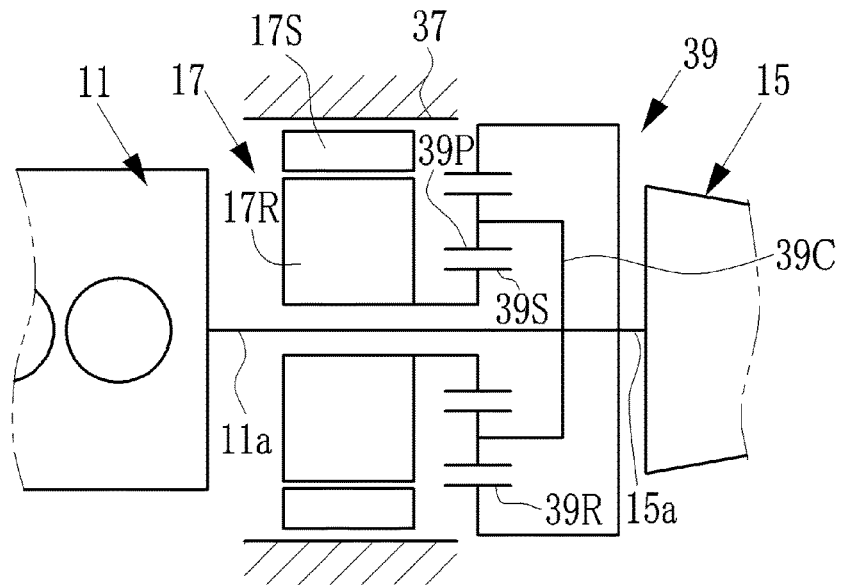
FIG. 3 is a schematic illustration showing another example of a transmission in the four-wheel drive vehicle shown in FIG. 1.

FIG. 3 shows another example of the planetary gear unit serving as a power splitting device 39. A single pinion planetary gear unit may be adopted as the power splitting device 39. In the power splitting device 39, the rotor 17R of the rear drive motor 17 is connected to a sun gear 39S, the output shaft 11a is connected to a carrier 39C, and the input shaft 15a is connected to a ring gear 39R. A power generated by the engine 11 is distributed to the rear drive motor 17 and the transmission 15. The rear drive motor 17 generates electricity by being rotated by the engine 11, and a reaction force accompanying that electricity generation is applied to the sun gear 39S. A rotational speed of the engine 11 is controlled to a rotational speed of good fuel efficiency by the rear drive motor 17, and the transmission 15 is inputted with a combined torque of an output torque of the engine 11 and a reaction force torque due to the rear drive motor 17.

Note that the rear drive motor 17 may be connected to the output shaft 11a or input shaft 15a directly, omitting the above-mentioned planetary gear unit 36 or 39. In this case, the rotor 17R is directly mated with the output shaft 11a or input shaft 15a. Moreover, the rear drive motor 17 and the planetary gear unit 36, 39 may be omitted.

Figure 4:
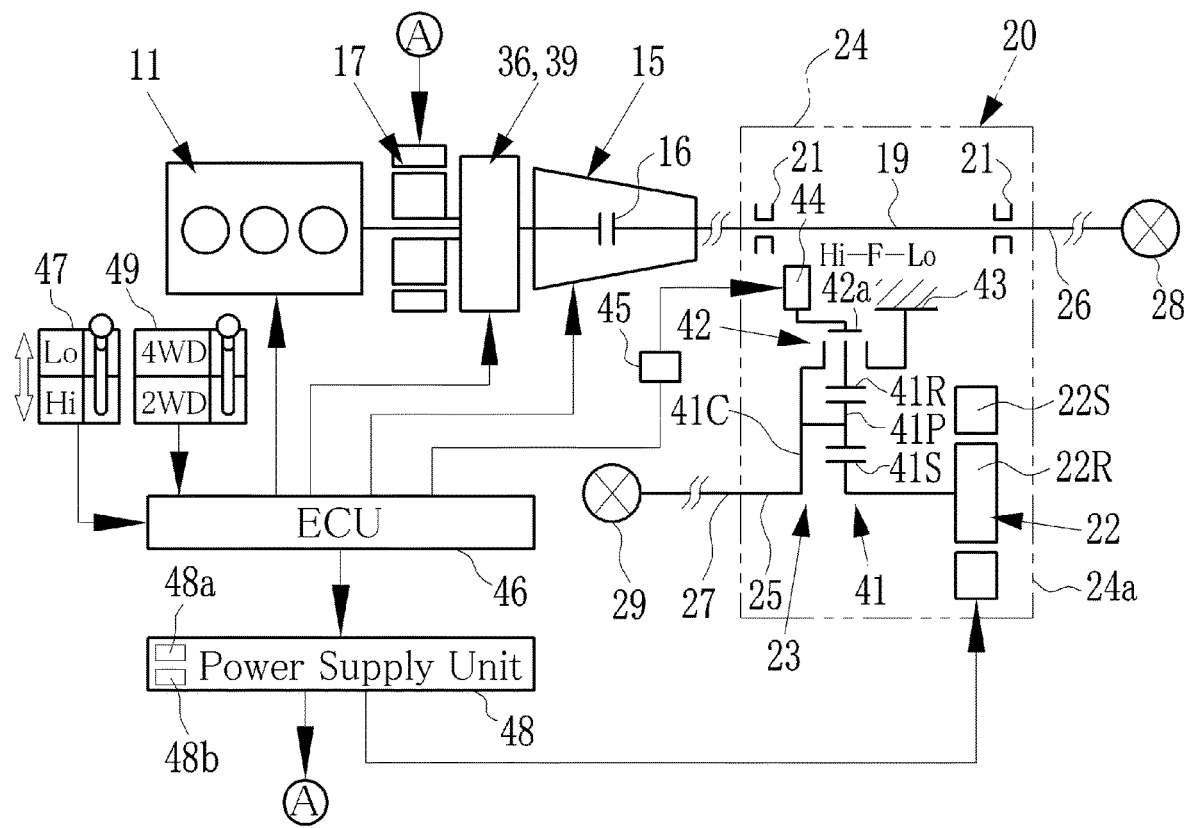
FIG. 4 is a schematic illustration showing an example of a front drive unit in the four-wheel drive vehicle shown in FIG. 1.

FIG. 4 shows another example of the front drive unit 20. As shown in FIG. 4, the front transmission 23 of the front drive unit 20 includes: a planetary gear unit 41 that is disposed on the inside of the case 24 coaxially with the sub-shaft 25; and a switching device 42.

The planetary gear unit 41 includes: a sun gear 41S; a ring gear 41R as an internal gear arranged concentrically with the sun gear 41S; a plurality of pinion gears 41P engaging with the sun gear 41S and the ring gear 41R; and a carrier 41C supporting the pinion gears 41P in a rotatable manner.

The sub-shaft 25 is connected to the carrier 41C. In the front drive motor 22 disposed coaxially with the planetary gear unit 41, the rotor 22R is connected to the sun gear 41S, and a stator 22S is fixed to the certain stationary member 37 provided in the case 24.

The switching device 42 includes a sleeve 42a, and the sleeve 42a is shifted between a High position, a Free position, and a Low position, by an actuator 44. By moving the sleeve 42a to the Low position, the ring gear 41R and carrier 41C are connected, and a gear stage of the front transmission 23 is set to a first stage in which a speed ratio is largest. By moving the sleeve 42a to the Free position, the ring gear 41R is enabled to rotate, and torque transmission between the sun gear 41S and the rotor 22R of the front drive motor 22 is interrupted. By moving the sleeve 42a to the High position, the ring gear 41R is engaged with a stationary member 43, and the gear stage of the front transmission 23 is set to a second stage in which a speed ratio is smaller than that in the first stage. Now, a speed ratio refers to a ratio of an input side rotational speed to an output side rotational speed of the planetary gear unit 41. In the embodiment shown in FIG. 4, the speed ratio is the ratio of the rotational speed of the sun gear 41S to the rotational speed of the carrier 41C.

Gear stages and drive modes of the vehicle shown in FIG. 4 are controlled by an Electronic Control Unit (to be abbreviated as the "ECU" hereinafter) 46 as a controller. The ECU 46 sends to the actuator 44, via a driver 45, a command signal that is based on a position of a gear stage switching lever 47 as an operating section disposed in a periphery of a driving seat. Similarly, the ECU 46 switches a drive mode between a two-wheel drive mode and a four-wheel drive mode, based on a position of a drive mode switching lever 49 disposed in the periphery of the driving seat.

Specifically, the ECU 46 controls the switching device 42 in such a manner that when the gear stage switching lever 47 has been moved to the High position, the front transmission 23 is set to the second stage, and controls the switching device 42 in such a manner that when the gear stage switching lever 47 has been moved to the Low position, the front transmission 23 is set to the first stage. When the drive mode switching lever 49 has been moved to a 2WD position, the ECU 46 moves the sleeve 42a of the switching device 42 to the Free position. In this case, the front drive motor 22 is stopped, and the drive mode becomes the 2WD mode in which the rear wheels 13 are driven by an output torque of the engine 11 or rear drive motor 17.

By moving the sleeve 42a of the switching device 42 to the Free position, the front drive motor 22 is disconnected from the sub-shaft 25, and torque transmission between the front propeller shaft 27 and the front drive motor 22 is interrupted. As a result, the front drive motor 22 is not passively rotated by the engine 11. In other words, a drag loss of the front drive motor 22 can be reduced. Moreover, a speed of the front propeller shaft 27, that is, a vehicle speed is not limited by a structural maximum rotational speed of the front drive motor 22. For this reason, the vehicle can run at a high vehicle speed (for example, 130 km/h or more) by the engine 11. Thus, the switching device 42 serves as an interrupting device for interrupting torque transmission between the front drive motor 22 and the sub-shaft 25.

When running on a surfaced road, high speed running is enabled by establishing the second stage. On the other hand, when running off-road or on an uphill road, the vehicle can be run by a large driving power by selecting the first stage. Note that the gear stage switching lever 47 or drive mode switching lever 49 may be the likes of a switch, for example.

The ECU 46 also controls the engine 11, a transmission device 18, and the transmission 15. In addition, the ECU 46 also controls the rear drive motor 17 and the front drive motor 22 via a power supply unit 48. The power supply unit 48 includes an electricity storing device 48a and an inverter 48b, and the rear drive motor 17 and front drive motor 22 are operated as a motor or electric power generator by the power supply unit 48.

Figure 5:
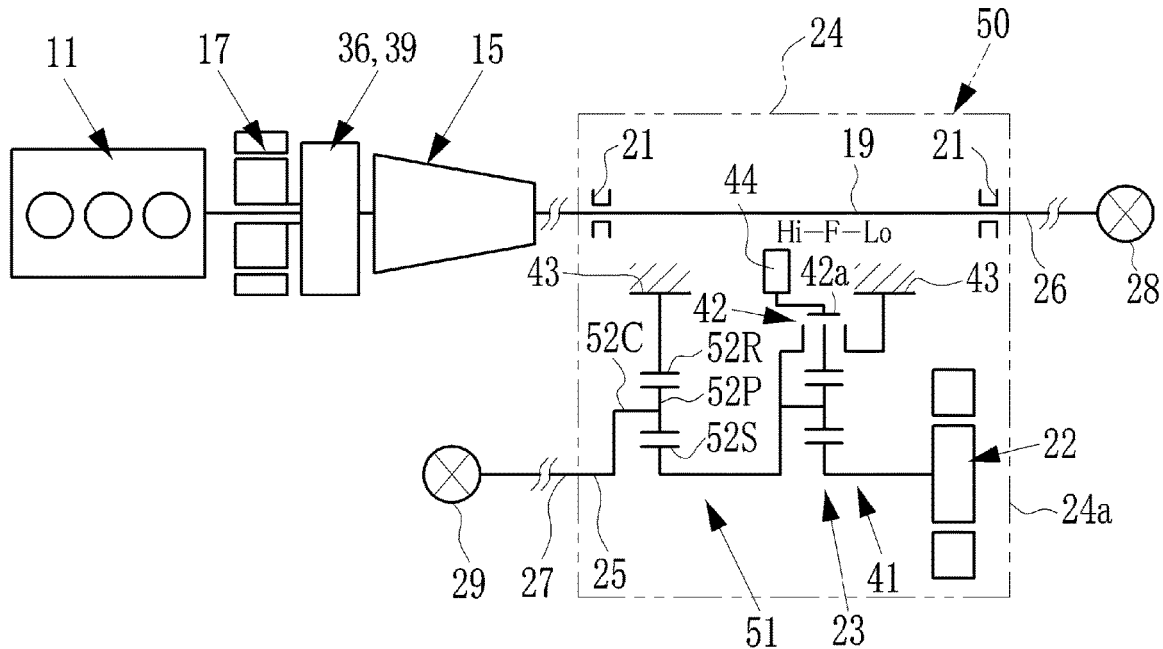
FIG. 5 is a schematic illustration showing another example of a front drive unit in the four-wheel drive vehicle shown in FIG. 1.

FIG. 5 shows a front drive unit 50 which is the front drive unit 20 shown in FIG. 4 to which a speed reducing device 51 has been added. In order to amplify an output torque of the front drive motor 22, the speed reducing device 51 is disposed on the inside of the case 24, coaxially with the sub-shaft 25, on an output side of the front transmission 23. Specifically, the speed reducing device 51 sets a rotational speed of the front propeller shaft 27 to a low rotational speed with respect to a rotational speed of the rotor 22R. A planetary gear unit, for example, may be used as the speed reducing device 51. The speed reducing device 51 includes: a sun gear 52S; a ring gear 52R as an internal gear arranged concentrically with the sun gear 52S; a plurality of pinion gears 52P engaging with the sun gear 52S and the ring gear 52R; and a carrier 52C supporting the pinion gears 52P in a rotatable manner.

The sub-shaft 25 is connected to the carrier 52C, the sun gear 52S is connected to a second carrier 42C of the planetary gear unit 41 of the front transmission 23, and the ring gear 52R is fixed to the stationary member 43.

Thus, in the example shown in FIG. 5, since the front drive unit 50 is provided with the speed reducing device 51, it is possible to adopt a motor of lower torque and higher rotational speed than the front drive motor 22. In other words, since an outer diameter of the front drive motor 22 can be reduced, the front drive unit 50 can be downsized.

Figure 6:
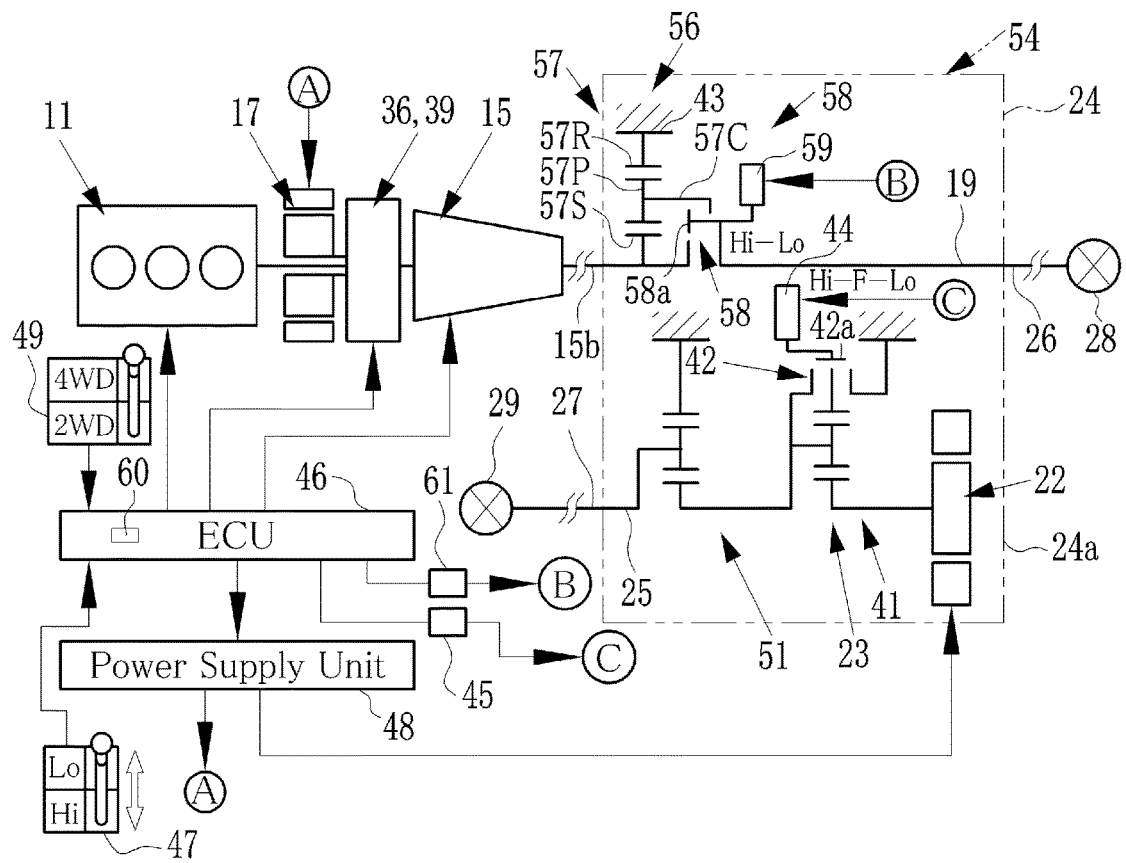
FIG. 6 is a schematic illustration showing yet another example of a front drive unit in the four-wheel drive vehicle shown in FIG. 1.

FIG. 6 shows an example in which there has been added to the front drive unit 50 shown in FIG. 5 a sub-transmission 56 that increases and decreases an output torque of the transmission 15. A front drive unit 54 shown in FIG. 6 is provided on the inside of the case 24, and the sub-transmission 56 includes: a planetary gear unit 57 disposed coaxially with the main shaft 19; and a rear switching device 58.

The planetary gear unit 57 includes: a sun gear 57S; a ring gear 57R as an internal gear arranged concentrically with the sun gear 57S; a plurality of pinion gears 57P engaging with the sun gear 57S and the ring gear 57R; and a carrier 57C supporting the pinion gears 57P in a rotatable manner. In the planetary gear unit 57, the output shaft 15b is connected to the sun gear 57S, and the ring gear 57R is fixed to the stationary member 43.

The rear switching device 58 includes a sleeve 58a, and the sleeve 58a is shifted between the Low position and the High position by an actuator 59. By moving the sleeve 58a to the High position, the sun gear 57S and the rear propeller shaft 26 are connected, and a gear stage of the sub-transmission 56 is set to the first stage in which a speed ratio is larger than that in the second stage. By moving the sleeve 58a to the Low position, the carrier 57C and the rear propeller shaft 26 are connected, and the gear stage of the sub-transmission 56 is set to the second stage having a smaller speed ratio than that in the first stage. Now, a speed ratio refers to a ratio of an input side rotational speed to an output side rotational speed of the planetary gear unit 57. In the embodiment shown in FIG. 6, the speed ratio is the ratio of the rotational speed of the rear propeller shaft 26 to the rotational speed of the output shaft 15b (sun gear 57S).

In order to control the rear switching device 58, the ECU 46 sends to the actuator 59, via a driver 61, a command signal that is based on the position of the gear stage switching lever 47.

Specifically, the ECU 46 controls the rear switching device 58 in such a manner that when the gear stage switching lever 47 has been moved to the High position, the sub-transmission 56 is set to the second stage, and controls the rear switching device 58 in such a manner that when the gear stage switching lever 47 has been moved to the Low position, the sub-transmission 56 is set to the first stage.

In addition, the ECU 46 controls the switching device 42 in such a manner that when the gear stage switching lever 47 has been moved to the High position, the front transmission 23 is set to the second stage, and controls the switching device 42 in such a manner that when the gear stage switching lever 47 has been moved to the Low position, the front transmission 23 is set to the first stage.

To this end, the ECU 46 includes a transmission controller 60 that enables the front transmission 23 and the sub-transmission 56 to be cooperatively controlled. Specifically, the transmission controller 60 is configured such that the same gear stage is established by the switching device 42 and the rear switching device 58, based on the position of the gear stage switching lever 47. For example, when the gear stage switching lever 47 has been moved to the Low position, the switching device 42 and the rear switching device 58 may each be controlled so as to establish the first stage. Similarly, when the gear stage switching lever 47 has been moved to the High position, the switching device 42 and the rear switching device 58 are each controlled so as to enable the second stage to be established.

Note it is possible for the first stage to be established by the switching device 42 when the rear switching device 58 is establishing the second stage. In such a case, since sufficient torque can be transmitted to the front wheels 14 in an initial phase of vehicle start or an initial phase of acceleration, responsiveness during vehicle start or acceleration improves. In other words, the transmission controller 60 is configured such that when the gear stage switching lever 47, which is configured capable of being shifted to two or more positions, has been moved to a position where speed ratio will be maximum, the switching device 42 and the rear switching device 58 are each controlled so as to establish the first stage. In this case, when the gear stage switching lever 47 has been switched to a position other than the position where speed ratio will be maximum, the switching device 42 and the rear switching device 58 may be set to the same gear stage, or may be set to different gear stages.

Figure 7:
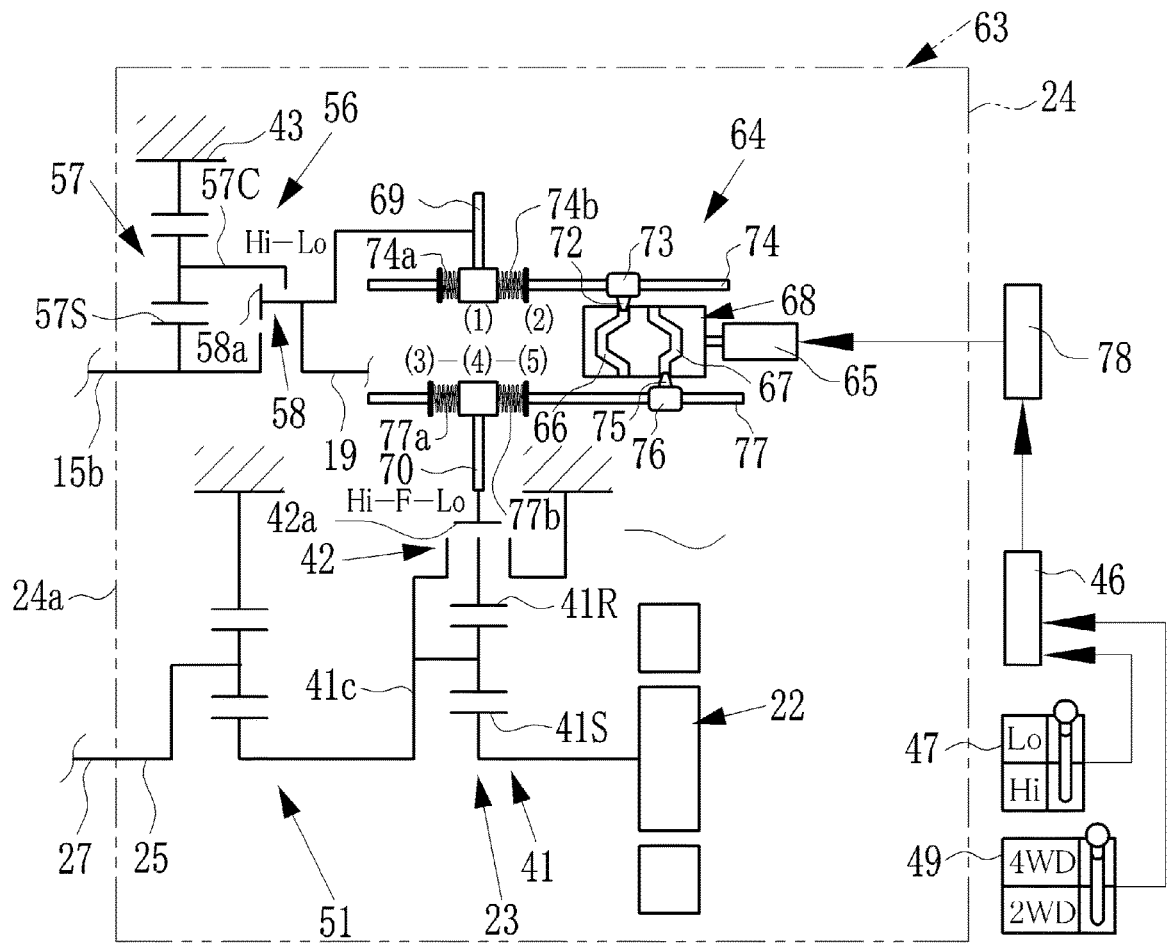
FIG. 7 is a schematic illustration showing an example of a front drive unit in which a front transmission and a sub-transmission have been mechanically interlocked.

FIG. 7 shows an example in which the front transmission 23 and the sub-transmission 56 have been mechanically interlocked. In the example shown in FIG. 7, a front drive unit 63 includes an interlocking member 64 that mechanically interlocks the front transmission 23 and the sub-transmission 56. Therefore, in the configuration shown in FIG. 7, the number of actuators can be reduced to one, compared to in the front drive unit 54 shown in FIG. 6.

The interlocking member 64 includes: a drum 68 that has formed on its outer peripheral surface a rear cam groove 66 and a front cam groove 67; and an actuator 65 that rotates the drum 68. A cam follower 72 fits in the rear cam groove 66, and a rear fork 69 is connected to a head 73 of the cam follower 72 via a shaft 74 disposed in parallel with the main shaft 19. By rotating the drum 68, the rear fork 69 moves in an axial direction of the shaft 74 along the rear cam groove 66.

As a result, when the rear fork 69 has moved to a first position (1), a position of the sleeve 58a of the rear switching device 58 moves to the Low position, and when the rear fork 69 has moved to a second position (2), the position of the sleeve 58a of the rear switching device 58 moves to the High position. Specifically, by moving the rear fork 69 to the first position, the sun gear 57S is connected to the main shaft 19, and, moreover, by moving the rear fork 69 to the second position, the carrier 57C is connected to the main shaft 19. Another clutch mechanism such as a wet multiplate clutch may be employed as the switching device 42 and rear switching device 58. In order to apply a load directing the rear fork 69 to a neutral position between the first position and the second position, the rear fork 69 is provided with pushing members 74a, 74b.

A cam follower 75 fits in the front cam groove 67. A front fork 70 is connected to a head 76 of the cam follower 75 via a shaft 77 disposed in parallel with the main shaft 19. By rotating the drum 68, the front fork 70 moves in an axial direction of the shaft 77 along the front cam groove 67.

As a result, when the front fork 70 has moved to a third position (3), a position of the sleeve 42a of the switching device 42 moves to the High position; when the front fork 70 has moved to a fourth position (4), the position of the sleeve 42a of the switching device 42 moves to the Free position; and when the front fork 70 has moved to a fifth position (5), the position of the sleeve 42a of the switching device 42 moves to the High position. Specifically, by moving the front fork 70 to the third position, the carrier 41C is connected to the ring gear 41R; by moving the front fork 70 to the fourth position, the ring gear 41R is freed and the front drive motor 22 is disconnected from the front propeller shaft 27; and by moving the front fork 70 to the fifth position, the ring gear 41R is connected to the stationary member 43. In order to apply a load directing the front fork 70 to a neutral position between the third position and the fifth position, the front fork 70 is provided with pushing members 77a, 77b.

The rear cam groove 66 and the front cam groove 67 are formed in such a manner that when the drum 68 has rotated so as to move the front fork 70 to the third position, the rear fork 69 moves to the second position. When the drum 68 has rotated so as to move the front fork 70 to the fifth position, the rear fork 69 moves to the first position. When the drum 68 has rotated so as to move the front fork 70 to the fourth position, the rear fork 69 is maintained in an immediately preceding position.

Specifically, when the drum 68 has been rotated to a first rotational position, the front fork 70 moves to the third position, and the rear fork 69 moves to the second position. When the drum 68 has been rotated to a second rotational position, the front fork 70 moves to the fourth position, and the rear fork 69 moves to the second position. When the drum 68 has been rotated to a third rotational position, the front fork 70 moves to the fifth position, and the rear fork 69 moves to the first position. When the drum 68 has been rotated to a fourth rotational position, the front fork 70 moves to the fourth position, and the rear fork 69 moves to the first position.

The drum 68 is rotated to a desired rotational position by controlling the actuator 65 based on positions of the gear stage switching lever 47 and the drive mode switching lever 49. Specifically, when the position of the gear stage switching lever 47 is the High position and the position of the drive mode switching lever 49 is the 4WD position, the drum 68 is rotated to the first rotational position. When the position of the gear stage switching lever 47 is the High position and the position of the drive mode switching lever 49 is the 2WD position, the drum 68 is rotated to the second rotational position. When the position of the gear stage switching lever 47 is the Low position and the position of the drive mode switching lever 49 is the 4WD position, the drum 68 is rotated to the third rotational position. When the position of the gear stage switching lever 47 is the Low position and the position of the drive mode switching lever 49 is the 2WD position, the drum 68 is rotated to the fourth rotational position.

Note that the front cam groove 67 may be provided with a bypass groove, so that the position of the sleeve 42a of the switching device 42 shifts directly between the first position and the second position skipping the Free position. In this case, a slip block is provided in the front cam groove 67 in a manner allowing the slip block to move between a normal position and a bypass position. When the slip block is in the normal position, the front cam follower 75 can pass along the front cam groove 67, and the bypass groove is closed. When the slip block is in the bypass position, the front cam follower 75 can pass along the bypass groove, and the front cam groove 67 is closed. In this case, a gear shift in the four-wheel drive mode may be performed without temporarily interrupting torque transmission between the front drive motor 22 and the sub-shaft 25.

Figure 8:
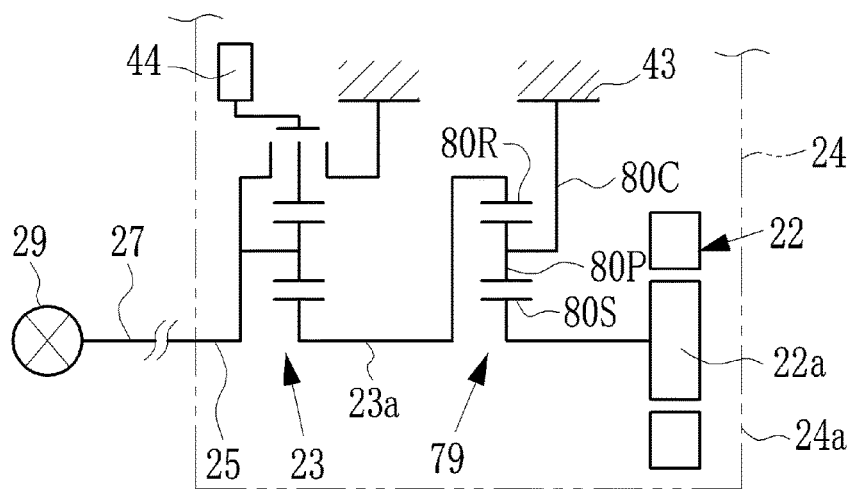
FIG. 8 is a schematic illustration showing a front speed reducing device.

FIG. 8 shows an example in which a front speed reducing device 79 as a planetary gear unit is disposed on an input side of the front transmission 23. In the front speed reducing device 79, a sun gear 80S is connected to the rotor shaft 22a of the front drive motor 22, a carrier 80C is connected to the stationary member 43, and a ring gear 80R is connected to an input shaft 23a of the front transmission 23.

Figure 9:
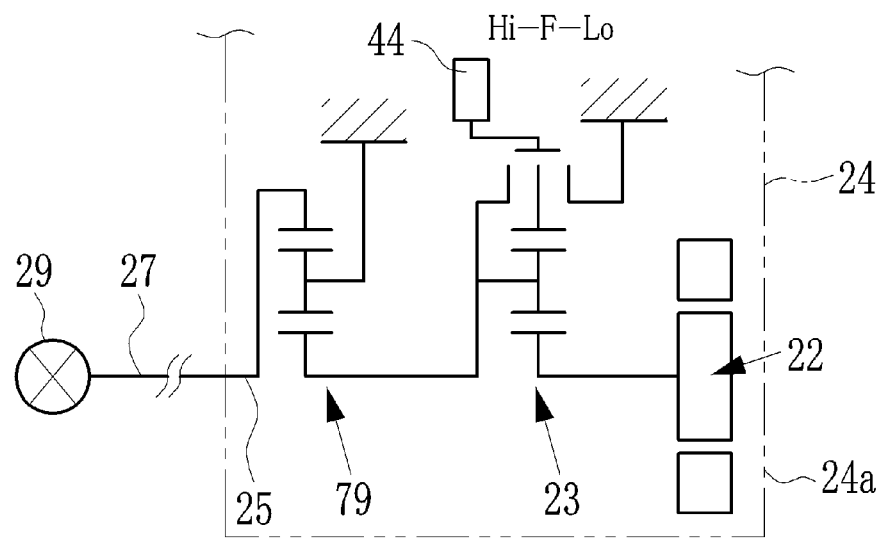
FIG. 9 is a schematic illustration showing another example of a front speed reducing device.

FIG. 9 shows an example where a stationary element (a reaction force element) and an output element have been switched in the front speed reducing device shown in FIG. 7. Specifically, in the front speed reducing device 79 shown in FIG. 9, the carrier 80C is connected to the stationary member thereby configuring the stationary element, and the ring gear 80R is connected to the front propeller shaft 27 thereby configuring the output element.

Figure 10:
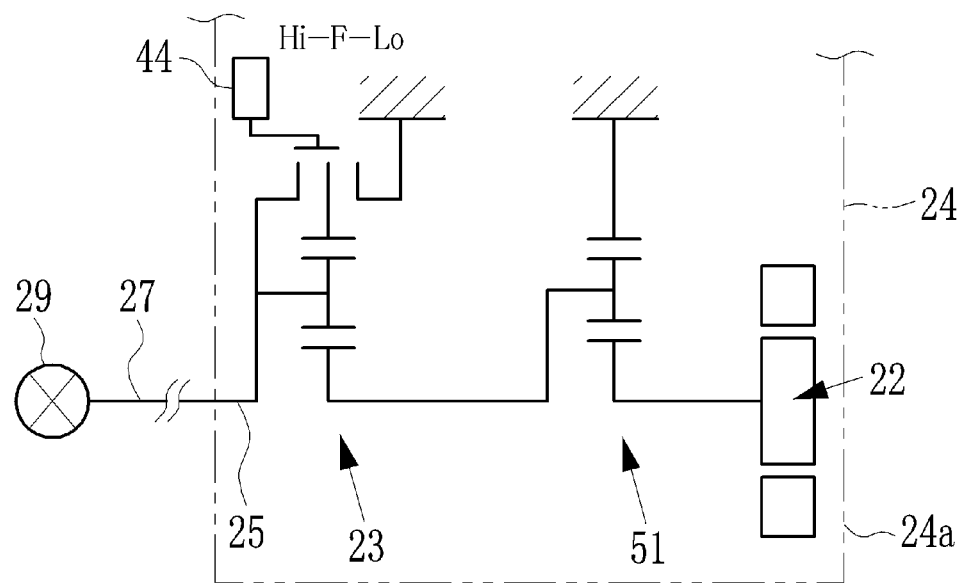
FIG. 10 is a schematic illustration showing another example of a front transmission and a speed reducing device.

FIG. 10 shows an example where a stationary element (a reaction force element) and an output element have been switched in the front speed reducing device shown in FIG. 8. Specifically, in the speed reducing device 51 shown in FIG. 10, the ring gear 52R is connected to the stationary member thereby configuring the stationary element, and the carrier 52C is connected to the sun gear of the front transmission 23 thereby configuring the output element.

Figure 11:
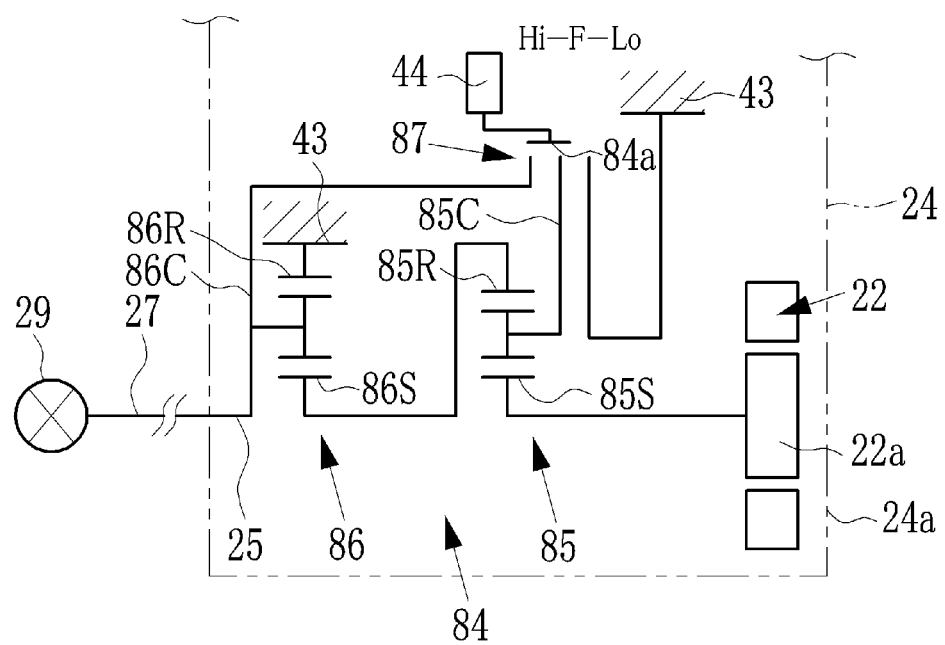
FIG. 11 is a schematic illustration showing yet another example of a front speed reducing device.

FIG. 11 shows an example in which a compound planetary gear unit 84 has been configured by combining the front transmission and the front speed reducing device in the front drive unit. The compound planetary gear unit 84 includes a first planetary gear unit 85 and a second planetary gear unit 86.

The first planetary gear unit 85 includes: a sun gear 85S serving as a first element connected to the rotor shaft 22a of the front drive motor 22; a ring gear 85R serving as a second element connected to the second planetary gear unit 86; and a carrier 85C serving as a third element.

The second planetary gear unit 86 includes: a sun gear 86S serving as a fourth element connected to the ring gear 85R; a ring gear 86R serving as a fifth element fixed to the stationary member 43; and a carrier 86C serving as a sixth element connected to the sub-shaft 25.

The compound planetary gear unit 84 includes a switching device 87. A sleeve 87a of the switching device 87 is shifted between the High position, the Free position, and the Low position by the actuator 44. By moving the sleeve 87a to the High position, the carrier 86C and the carrier 85C are connected; by moving the sleeve 87a to the Free position, connection of the carrier 86C and the carrier 85C is released; and by moving the sleeve 87a to the Low position, the carrier 85C and the certain stationary member 43 are connected.

When the sleeve 87a has been moved to the Free position, the carrier 85C is released. As a result, a reaction force applied to the sun gear 85S is released, and the first planetary gear unit 85 ceases to transmit a torque to the rotor shaft 22a of the front drive motor 22. In other words, the first planetary gear unit 85 attains a neutral state.

The drive unit for four-wheel drive vehicle in the embodiments of the present disclosure includes two motors 17, 22 as explained by FIG. 4. Therefore, a variety of operating modes may be established.

The ECU 46 shown in FIG. 4 is configured mainly by a microcomputer, performs computation using inputted data and pre-stored data, and outputs a result of the computation as a command signal. For example, the ECU 46 is inputted with a position of an accelerator pedal, a vehicle speed, a pedal force applied to a brake pedal, a state of charge (to be abbreviated as "SOC" hereinafter) level of the electricity storing device, speeds of the front wheels 14 and the rear wheels 13, a cooling water temperature of the engine 11, and so on.

The ECU 46 controls the operating mode or driving power. The operating mode is selected from: an Electric Vehicle mode where the vehicle runs without using the driving power of the engine 11; and a Hybrid mode where the vehicle runs by the driving powers of the engine 11 and either of the motors 17, 22. The Hybrid mode is selected from a Series mode and a Parallel mode. The Series mode is a mode where the vehicle runs by driving the front drive motor 22 by electric power generated by the rear drive motor 17, and the Parallel mode is a mode where the vehicle runs by the driving powers of the engine 11 and each of the motors 17, 22.

In each of the modes, the front drive motor 22 can generate electricity during braking. For example, when the accelerator pedal has been returned or the brake pedal has been depressed in the Electric Vehicle mode, the front drive motor 22 is caused to serve as an electric power generator, thereby regenerating energy. In this case, the front drive motor 22 generates electricity by being rotated by an inertial force transmitted from the front wheels 14. Note that during deceleration, the grounding load of the front wheels 14 is large, hence regenerative torque or regenerative rotational speed are large, and efficiency of energy regeneration improves.

When the SOC level is high and demanded driving power is small, the Electric Vehicle mode is selected. In the Electric Vehicle mode, in order to prevent torque from being transmitted in the transmission 15, the clutch 16 or brake is released, whereby a neutral state is set. Moreover, the engine 11 and the rear drive motor 17 are stopped. In contrast, the front drive motor 22 drives the front wheels by being operated as a motor so as to generate a torque.

When the SOC level has lowered, when a temperature of the engine 11 has lowered, or when the accelerator pedal has been depressed, motoring of the engine 11 is performed by the rear drive motor 17. In this case, the transmission 15 is set to neutral to prevent torque of the rear drive motor 17 from being transmitted. Note that the front drive motor 22 is operated as a motor or stopped, according to circumstances.

In the Series mode, the rear drive motor 17 is driven by the engine 11 to generate electric power, the front drive motor 22 is operated as a motor by the electric power generated by the rear drive motor 17, and the front wheels 14 are driven by torque of the front drive motor 22. In this case, the transmission 15 may be set to neutral to prevent a drive torque of the engine 11 from being transmitted to the rear wheels 13. In the Series mode, energy can be regenerated by the front drive motor 22 during deceleration, similarly to in the Electric Vehicle mode.

In the Parallel mode, the vehicle runs by driving powers of the engine 11 and the motors 17, 22. Specifically, the rear drive motor 17 is operated as a motor by electric power of the electricity storing device 48a, and the transmission 15 is set to a certain gear stage to transmit torque of the engine 11 to the rear wheels 13. Thus, in the Parallel mode, torque generated by the engine 11 and the rear drive motor 17 is transmitted to a rear wheels 13 side via the transmission 15, and torque of the front drive motor 22 is transmitted to the front wheels 14. In other words, the vehicle runs by a large driving power in the 4WD mode.

During deceleration in the Parallel mode, torque due to a running inertial force can be transmitted from the front wheels 14 and the rear wheels 13 to each of the motors 17, 22, and energy regeneration can be performed by each of the motors 17, 22.

Although the above exemplary embodiments of the present disclosure have been described, it will be understood by those skilled in the art that the present application should not be limited to the described exemplary embodiments, and various changes and modifications can be made within the scope of the present disclosure. For example, a double pinion planetary gear unit may be used as the speed reducing devices 51, 79, the transmissions 23, 56, the transmission device 18, the power splitting device 39, and the compound planetary gear unit 84.

Moreover, the rear drive motor 17 may be omitted and the rear wheels 13 driven by the engine 11.

What is claimed is:

1. A drive unit for a four-wheel drive vehicle, the four-wheel drive vehicle comprising a pair of front wheels and a pair of rear wheels, the drive unit comprising:
    a prime mover that is disposed between the front wheels;
    a transmission that is disposed to a rear of the engine;
    a rear propeller shaft that transmits a torque to the rear wheels;
    a front propeller shaft that is disposed in a position shifted in one direction in a width direction of a vehicle body with respect to the rear propeller shaft, and transmits a torque to the front wheels; and
    a front drive unit that is disposed to the rear of the transmission and closer to a front of the vehicle than an axle of the rear wheels,
    wherein the front drive unit comprises: a main shaft that transmits an output torque of the transmission to the rear propeller shaft ; a first motor that is disposed in a position shifted in the width direction with respect to the main shaft and drives the front wheels; a sub-shaft that transmits to the front propeller shaft a torque of the first motor; and a case that houses the main shaft, the first motor, and the sub-shaft, and
    wherein the front drive unit is not configured to transmit the output torque of the transmission to the front wheels,
    the front drive unit is disposed on the inside of the case coaxially with the sub-shaft,
    a gear stage of the front drive unit includes a plurality of gear stages whose speed ratios differ,
    the front drive unit further comprises:
        a front transmission that increases and decreases a torque of the rotor shaft, and
        a sub-transmission that is disposed in the case coaxially with the main shaft and that establishes a plurality of gear stages,
        wherein the sub-transmission increases and decreases a torque transmitted from the transmission, and
    the drive unit further comprises:

an operating section for selecting a gear stage between the front transmission and the sub-transmission; and an interlocking section that, by the operating section being shifted to a position establishing a gear stage as a maximum speed ratio, sets the gear stage of the front transmission to a first stage as a maximum speed ratio, and sets the sub-transmission to a first stage as a maximum speed ratio.

2. A drive unit for a four-wheel drive vehicle, the four-wheel drive vehicle comprising a pair of front wheels and a pair of rear wheels, the drive unit comprising:

a prime mover that is disposed between the front wheels;

a transmission that is disposed to a rear of the engine;

a rear propeller shaft that transmits a torque to the rear wheels;

a front propeller shaft that is disposed in a position shifted in one direction in a width direction of a vehicle body with respect to the rear propeller shaft, and transmits a torque to the front wheels; and a front drive unit that is disposed to the rear of the transmission and closer to a front of the vehicle than an axle of the rear wheels, wherein the front drive unit comprises: a main shaft that transmits an output torque of the transmission to the rear propeller shaft ; a first motor that is disposed in a position shifted in the width direction with respect to the main shaft and drives the front wheels; a sub-shaft that transmits to the front propeller shaft a torque of the first motor; and a case that houses the main shaft, the first motor, and the sub-shaft, and wherein the front drive unit is not configured to transmit the output torque of the transmission to the front wheels, the drive unit further comprises:

a second motor having an electric power generating function, that is disposed between the engine and the transmission and adds a torque to a torque generated by the engine;

a clutch that is provided in the transmission and selectively interrupts a torque transmission to the main shaft;

an electricity storing device that stores electric power generated by the second motor; and an electric power supplying section that supplies the first motor with electric power stored in the electricity storing device.

3. A drive unit for a four-wheel drive vehicle, the four-wheel drive vehicle comprising a pair of front wheels and a pair of rear wheels, the drive unit comprising:

an engine that is disposed between the front wheels;

a transmission that is disposed to the rear of the engine;

a rear propeller shaft that transmits a torque to the rear wheels;

a front propeller shaft that is disposed in a position shifted in one direction in a width direction of a vehicle body with respect to the rear propeller shaft, and transmits a torque to the front wheels; and a front drive unit that is disposed to the rear of the transmission and closer to a front of the vehicle than an axle of the rear wheels, wherein the front drive unit comprises: a main shaft that transmits to the rear propeller shaft an output torque of the transmission; a first motor that is disposed in a position shifted in the one direction with respect to the main shaft; a sub-shaft that transmits to the front propeller shaft a torque of a rotor shaft of the first motor; and a case that houses the main shaft, the first motor, and the sub-shaft, the front drive unit is disposed on the inside of the case coaxially with the sub-shaft, a gear stage of the front drive unit includes a plurality of gear stages whose speed ratios differ, the front drive unit further comprises:

a front transmission that increases and decreases a torque of the rotor shaft, and a sub-transmission that is disposed in the case coaxially with the main shaft and that establishes a plurality of gear stages, wherein the sub-transmission increases and decreases a torque transmitted from the transmission, and the drive unit further comprises:

an operating section for selecting a gear stage between the front transmission and the sub-transmission; and an interlocking section that, by the operating section being shifted to a position establishing a gear stage as a maximum speed ratio, sets the gear stage of the front transmission to a first stage as a maximum speed ratio, and sets the sub-transmission to a first stage as a maximum speed ratio.

4. A drive unit for a four-wheel drive vehicle, the four-wheel drive vehicle comprising a pair of front wheels and a pair of rear wheels, the drive unit comprising:

an engine that is disposed between the front wheels;

a transmission that is disposed to the rear of the engine;

a rear propeller shaft that transmits a torque to the rear wheels;

a front propeller shaft that is disposed in a position shifted in one direction in a width direction of a vehicle body with respect to the rear propeller shaft, and transmits a torque to the front wheels; and a front drive unit that is disposed to a rear of the transmission and closer to a front of the vehicle than an axle of the rear wheels, wherein the front drive unit comprises: a main shaft that transmits to the rear propeller shaft an output torque of the transmission; a first motor that is disposed in a position shifted in the one direction with respect to the main shaft; a sub-shaft that transmits to the front propeller shaft a torque of a rotor shaft of the first motor; and a case that houses the main shaft, the first motor, and the sub-shaft, the drive unit further comprises:

a second motor having an electric power generating function, that is disposed between the engine and the transmission and adds a torque to a torque generated by the engine;

a clutch that is provided in the transmission and selectively interrupts a torque transmission to the main shaft;

an electricity storing device that stores electric power generated by the second motor; and an electric power supplying section that supplies the first motor with electric power stored in the electricity storing device.

* * * * *